United States Patent
Balandin et al.

(10) Patent No.: US 8,103,869 B2
(45) Date of Patent: Jan. 24, 2012

(54) DISTRIBUTED (MODULAR) INTERNAL ARCHITECTURE

(75) Inventors: Sergey Balandin, Helsinki (FI); Michel Gillet, Helsinki (FI)

(73) Assignee: Nokia Corporation, Espoo (FI)

( * ) Notice: Subject to any disclaimer, the term of this patent is extended or adjusted under 35 U.S.C. 154(b) by 1374 days.

(21) Appl. No.: 11/655,119

(22) Filed: Jan. 19, 2007

(65) Prior Publication Data

US 2007/0174608 A1    Jul. 26, 2007

(30) Foreign Application Priority Data

Jan. 20, 2006  (EP) ..................... 06100685

(51) Int. Cl.
*H04L 29/06* (2006.01)

(52) U.S. Cl. ........ 713/160; 713/154; 709/242; 370/355; 726/13

(58) Field of Classification Search ............ 713/154, 713/160; 709/242; 370/355; 726/13
See application file for complete search history.

(56) References Cited

U.S. PATENT DOCUMENTS

| 5,726,644 | A | * | 3/1998 | Jednacz et al. ........... 340/825.52 |
| 6,154,839 | A | | 11/2000 | Arrow et al. |
| 6,163,844 | A | | 12/2000 | Duncan et al. |
| 7,209,976 | B2 | * | 4/2007 | Folkes et al. ............... 709/238 |
| 7,519,986 | B2 | * | 4/2009 | Singhal ........................ 726/2 |
| 2004/0177266 | A1 | | 9/2004 | Moyer et al. |
| 2005/0111490 | A1 | | 5/2005 | Gillet |
| 2007/0121596 | A1 | * | 5/2007 | Kurapati et al. ............ 370/356 |

OTHER PUBLICATIONS

International Search Report PCT/IB2007/050170 filed Jan. 18, 2007.

* cited by examiner

*Primary Examiner* — Eleni Shiferaw
*Assistant Examiner* — Paul Callahan
(74) *Attorney, Agent, or Firm* — Mintz, Levin, Cohn, Ferris, Glovsky & Popeo, P.C.

(57) ABSTRACT

A node configured for use in a communication network with a distributed architecture. The node comprises a key encryption functionality, a transceiving functionality for transmitting and receiving packets, a privilege level introduction functionality configured to introduce a privilege level into packets to be transmitted, and a comparison functionality configured to compare a privilege level of received packets with a privilege level assigned to a second node from which these packets are received, wherein these packets are dropped, if they violate the privilege level of said second node.

14 Claims, 6 Drawing Sheets

| $K_a$ | 8 bits | 8 bits | 1 bit | 1 bit | 14 bits | 8 bits | 0..16383 bytes | 8 bits | $K_a$ |
|---|---|---|---|---|---|---|---|---|---|
| SuP | flowID | SRC | firstUP | lastUP | size | CRC | PAYLOAD | CRC | EuP |

| $K_a$ | 8 bits | 8 bits | 1 bit | 1 bit | 14 bits | 8 bits | 0..16383 bytes | 8 bits |
|---|---|---|---|---|---|---|---|---|
| SuP | flowID | SRC | firstUP | lastUP | size | CRC | PAYLOAD | CRC |
| | | | | | | | | EuP |

Fig. 1

| $K_a$ | 8 bits | 8 bits | 1 bit | 1 bit | 3 bits | 3 bits | 8 bits | 1..256 symbols | 8 bits |
|---|---|---|---|---|---|---|---|---|---|
| SuP | flowID | SRC | firstUP | lastUP | num | ACK | size | PAYLOAD | CRC |
| | | | | | | | | | EuP |

| 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|----|----|----|----|----|----|----|
| Frame Seq.Number | | | | | EOF | | | ESC_DL | | | | | | | | 1 |

Fig. 5

| 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|----|----|----|----|----|----|----|
| Num of FC | | | Num of ACKs | | | | | ESC_DL | | | | | | | | 1 |

DISTRIBUTED (MODULAR) INTERNAL ARCHITECTURE

FIELD OF THE INVENTION

The present invention relates in general to developing a new distributed (modular) architecture for networks on mobile terminals which allows to reduce cost and speed up the design of the new mobile devices. Particularly, the present invention relates to aspects of a low power high-speed serial link bus designed for that distributed architecture.

BACKGROUND OF THE INVENTION

The move to a distributed architecture allows to significantly decrease design complexity of new mobile devices and as a result reduces time to market. Such a distributed architecture for a design in modular structure has been initiated by the Mobile Industry Processor Interface alliance (MIPI).

A key requirement of a device integrator is robustness and security of inter-device communications. Here, it is important to mention that the security threads are coming not only from "on purpose" violation of the internal rules, but also due to errors/misunderstanding created at the interface to the distributed architecture and on the layers above (applications). At the same time, cost is always a major factor for acceptance of the new technology.

A major issue at the present stage is the demand for the implementation of a simple and low cost security scheme in distributed network architectures on the mobile devices, which also increases their robustness. This demand is valid for the MIPI architecture, but also for a number of other distributed inter-device architectures such as "Discobus", "Spacewire", etc.

The robustness of a mobile device strongly depends on how secure the internal network of the components is, which implements the device functionality. It is especially important if the device should support the hot-plugin scenario, when the network has to identify how trustable the new nodes are. The current "Discobus" and "MIPI" proposals do not have an embedded security solution.

Although there is a broad range of prior art solutions in the area of network security (e.g. in the Internet), no prior art solution for the network types with the given features are yet known.

A further issue of the new distributed architecture is the datalink reliability of the bus technology of this distributed architecture. What has been suggested for this bus technology is a low power high-speed serial link bus designed to be a new kind of generic and modular bus well suited for portable terminals, but not limited to them. One example therefor is "Discobus" of the present Applicant which has many advantages compared to a traditional bus, such as that only few signals are needed, thus reducing the number of pins or balls on an IC package, and by consequence thus reducing the costs, that a much better electromagnetic compatibility (EMC) immunity is obtained, that it can replace many existing buses, because of its modularity and generality, and that it is hotpluggable.

As indicated above, what is now needed is a way of making a reliable datalink layer for this particular bus technology such as "Discobus" and the MIPI protocol stack specifications. The deployment of the reliable Datalink layer increases the network robustness and improves the reliability of the data transmission. Also the Datalink layer reliability in some cases de-facto can be seen as a way to provide the end-to-end (E2E) network reliability.

Specifically, present definitions of the bus technology do not necessarily contain a mechanism for providing the link level reliability. Lack of the Datalink layer reliability results in a need to create the E2E reliability schemes for all flow that require it, including different types of control and management traffic. There is an ongoing discussion among experts in the field whether the point-to-point reliability results in end-to-end reliability, but it is agreed that a bus that relies on the E2E reliability mechanism and does not have the link level reliability will significantly benefit from extending it with a new appropriate P2P reliability scheme.

Nowadays there is a number of P2P reliability solutions available, but the common problem is the traffic overhead created by the flow of acknowledgments. The standard way for decreasing the overhead is by grouping acknowledgments of multiple packets into a single acknowledgment message, however this approach does not solve the problem defined before, it just reduces its scale.

This problem becomes even more serious in the Quality of Service (QoS) aware networks, as the link level acknowledgments have to get at least the same level of service as the packets of the main flow. It requires to create an additional resource reservation for each link in the back direction, taking into account the worst-case scenario for acknowledgments (with smallest main flow packets granularity, and worst inter-arrival time). As a result the complexity of the resource reservation and management mechanisms is increasing dramatically, which in most cases leads to the network design errors.

A still further issue of the distributed architecture is related to the datalink layer scheme of acknowledgements. A current proposal implements the datalink layer reliability using a classical approach for providing End-to-End (E2E) reliability in the Internet. This method is based on a consistency analysis of the link level sequence numbers, which requires to reassign packet (frame) sequence numbers at each link. It also requires to re-compute a packet (frame) protection sequence (CRC) at each link. This method results in an increase of the datalink layer complexity and data overhead. Similar arguments are applicable to the currently used receiver (RX) buffer snapshot flow control mechanism, which transmits to the transmitter (TX) side information about the currently available size of RX buffer.

Finally, another issue of the distributed architecture is to achieve some kind of backward compatibility when building modular terminals, defining the interface between the modules, and above all concentrating on high speed.

In this connection, document US 2005/0111490 A1 discloses a communications bus having low latency interrupts and control signals, hotpluggability error detection and recovery, bandwidth allocation, network integrity verification, protocol tunneling and discoverability features. In detail, disclosed are methods and apparatus to control data and command flow over a physical communications channel between a transmitter and a receiver, and more specifically to provide a protocol for a point-to-point serial bus architecture with low latency time for flow control and other signaling, regardless of the length of the data packet frame. The abstract data flow control protocol can be employed by various buses as it interacts only with the lowest protocol layers. Separate buffers for data and control can be used to allow the bus to be compatible with slower buses also to support additional control functions without involving a higher protocol layer.

SUMMARY OF THE INVENTION

Thus, it is an object of the present invention to overcome the shortcomings of the prior art.

According to a first aspect of the present invention, there is provided a node configured for use in a communication network with a distributed architecture, comprising: a key encryption functionality; a transceiving functionality for transmitting and receiving packets; a privilege level introduction functionality configured to introduce a privilege level into packets to be transmitted; and a comparison functionality configured to compare a privilege level of received packets with a privilege level assigned to a second node from which these packets are received, wherein these packets are dropped, if they violate the privilege level of said second node.

Said privilege level can be introduced into a special field in the header of a packet to be transmitted.

The node may further comprise a trusted boot mechanism for said communication network configured to assign trust corresponding to a privilege level to other nodes. This node may be further configured to assign the trust to other nodes by a key encryption based authentication process.

The node may be further configured to acquire trust corresponding to a privilege level by a key encryption based authentication process.

The node may be further configured to isolate each port of said node from each other, and to only allow a secure point-to-point protocol at a boot-up process of said communication network. In this node, said isolation may be effected by temporarily disconnecting a data link layer from a network layer for every port.

According to a second aspect of the present invention, there is provided a method of spreading trust in a communication network using a distributed architecture, wherein said method uses trustable nodes defined by having key encryption capabilities and untrustable nodes defined by not having key encryption capabilities, comprising receiving packets by a trustable node; introducing a privilege level into packets to be transmitted by said trustable node; comparing a privilege level of said received packets with a privilege level assigned to any node from which these packets are received, wherein said received packets are dropped, if they violate the privilege level of said any node.

Said privilege level introducing step may include introducing said privilege level into a special field in the header of a packet to be transmitted.

The may further comprise assigning trust corresponding to a privilege level to other nodes by using a trusted boot mechanism for said communication network. In this method, said assigning step may include to assign the trust to other nodes by a key encryption based authentication process.

The method may further comprise acquiring trust corresponding to a privilege level by a key encryption based authentication process.

The method may further comprise to isolate each port of said node from each other, and allowing only a secure point-to-point protocol at a boot-up process of said communication network. In this method, said isolating step may include to temporarily disconnect a data link layer from a network layer for every port.

According to a third aspect of the present invention, there is provided a system configured to spread trust in a communication network with a distributed architecture, wherein said system is comprised of trustable nodes defined by having key encryption capabilities and untrustable nodes defined by not having key encryption capabilities, wherein selective ones of said trustable nodes and said untrustable nodes are operably connected so that they can transmit and receive packets between each other; wherein said trustable nodes are configured to introduce a privilege level into packets to be transmitted; and wherein said trustable nodes are configured to compare a privilege level of received packets with a privilege level assigned to a any node from which these packets are received, wherein said received packets are dropped, if they violate the privilege level of said any node.

In the system, said trustable nodes may be further configured to introduce said privilege level into a special field in the header of a packet to be transmitted.

In the system, said trustable nodes may be further configured to assign trust corresponding to a privilege level to other nodes by using a trusted boot mechanism for said communication network. In this, said trustable nodes may be further configured to assign the trust to other nodes by a key encryption based authentication process.

In the system, said trustable nodes may be further configured to acquire trust corresponding to a privilege level by a key encryption based authentication process.

In the system, said trustable nodes may be further configured to isolate each port of said trustable node from each other, and to only allow a secure point-to-point protocol at a boot-up process of said communication network. In this system, said trustable nodes may be further configured to effect said isolation by temporarily disconnecting a data link layer from a network layer for every port.

Thus, according to the present invention, the prior art network security solutions for the on-device networks with a distributed architecture are adopted and optimized. The network extensions according to the proposed features provide a notion of internal security, and make the network more sustainable to the possible misconfigurations and misbehaviors of some network nodes.

According to a fourth aspect of the present invention, there is provided a method of providing datalink layer reliability in a communication network using a distributed architecture, comprising using a datalink packet header having a field for carrying, in forward direction, a sequence number of a packet associated with said packet header, and having a field for carrying, in backward direction, acknowledgements for the forward traffic.

Thus, a solution is proposed which is applicable for the available Datalink layer implementations, and which defines an efficient way of implementing the datalink layer reliability.

Further advantages are that by adding (embedding) the main flow acknowledgment information into the structure of the reverse direction traffic, the proposed solution implements the link layer reliability with minimal bandwidth overhead, and without the traffic delay and jitter overheads. Moreover, in the protocols it does not add even bandwidth overhead, as the solution is built using the unused (reserved) bits in the packets header.

According to a fifth aspect of the present invention, there is provided a method of providing datalink layer reliability in a communication network using a distributed architecture, comprising using packets counter-based acknowledgements, using credit tokens-based flow control, and merging level 2 and level 3 packet data unit headers.

Hence, an alternative, more efficient way of implementing link level reliability and flow control, which allows merging of level 2 (L2) and level 3 (L3) Packet Data Unit (PDU) headers is provided, and as a result considerably decreases the complexity of the Datalink layer implementation and reduces data overhead. Thus, a new way of acknowledging Point-to-Point (P2P) data flow and the use of credit based flow control scheme on the P2P level is provided.

According to a sixth aspect of the present invention, there is provided a method of tunneling an inter-integrated circuit bus over a fast serial link bus in a communication network using a distributed architecture, comprising synchronizing the clock of a plurality of masters connected to said inter-integrated circuit bus; and arbitrating the control of the bus for accessing the bus between the plurality of masters; wherein the clock synchronization step includes a flow control mechanism by extending a low clock period.

Accordingly, a method is provided, which allows the tunneling of a serial computer bus such as an inter-integrated circuit ($I^2C$) to attach low-speed peripherals to e.g. a motherboard, an embedded system or a cellphone over a fast bus, which is independent of the latency of the bus or the network topology. This method enables to ensure a smooth transition between legacy and/or dedicated current interfaces towards a more generic approach.

BRIEF DESCRIPTION OF THE DRAWINGS

In the following, preferred embodiments of the present invention are described in detail by referring to the accompanying drawings, in which.

DETAILED DESCRIPTION OF THE PREFERRED EMBODIMENTS

A preferred embodiment of the present invention is based on the idea to move the complexity implied by key encryption in nodes of the network where the cost impact will be minimal. Since the most expensive elements in a network are the switches or routers, the key encryption will be placed in them.

Of course, an endpoint may have also key encryption capabilities. This observation leads to the definition of two different classes of nodes: Trustable nodes and Untrustable nodes. Trustable nodes are composed of switches/routers and endpoints having key encryption capabilities. Untrustable nodes are composed of endpoints without or very limited key encryption capabilities.

Starting from a single trusted node, the trust is propagated in the network from trustable nodes to trustable nodes by a secured protocol for example based on key encryption. The exact details of the protocol used for such a purpose is irrelevant as long as the chosen protocol matches or exceeds the security requirement set for the whole system. At the end of this procedure, all the trustable nodes form a trusted core network.

To extend a certain level of security to all untrustable endpoints of the network and form a secure network, a notion of privilege level is introduced at the packet level and associated with each endpoint in the network. In the header of each packet, a special field will be used to specify the privilege level of the packet. During the configuration state of the network, every endpoint will have its privilege level assigned by a node from the trusted core network. Since the network is based on point-to-point links, every node can have access to the network only through a switch/router. Since every switch/router is part of the trusted core network, a switch can enforce a certain level of security by controlling the privilege level of a node with the privilege level of packets emitted by this node. If a node attempts to emit a packet violating the privilege level of the node, the switch/router simply drops the packet.

By defining carefully the meaning of the privilege level, the network is secured by defining rules enforced by the trusted core network, which prohibits any untrustable nodes to perform any unauthorized access.

Of course, to be given the highest privilege level, a node must have key encryption capabilities. At the boot up of the system, only one node in the network has the highest level of privilege. The highest level of privilege can be given to another node only if this node succeeded the authentication based on key encryption.

According to a preferred embodiment, the impact on the network protocol stack is as follows.

Since the trust in the network propagates from node to node, it is very important that only the trusted nodes have access to the network. Stated in other words, during the building of the trusted core network, all nodes being not part of this trusted core should be isolated completely from the network.

Since the switch/routers are trustable nodes, the nodes already present in the trusted core network by definition are trustable. The responsibility to isolate untrustable nodes from the rest of the network falls on the switches/routers.

In the following, the concept of privilege levels according to a preferred embodiment is explained in detail.

Every packet and/or protocol can be assigned a certain privilege level. If a node in the network attempts to send a packet or use a protocol of higher privilege than its node privilege, the packets will be dropped by the following router, since the router will know the privilege level of this node after the boot up procedure.

The highest privilege is only given to nodes, which have a trusted boot mechanism. In any autonomous device at least one such node must be present and is called here seed of trust or trusted seed. One step down in privilege levels corresponds to nodes with full key encryption capabilities and protocols, which can acquire trust by encrypted communications with the trusted seed.

Since the privilege level is encoded in every packet, at least for connection less services, optimization could be used for connection-oriented services, and an amount of eight or sixteen levels seems ideal since coded respectively in three or four bits.

Next, a preferred embodiment for the trustable nodes is described in detail.

First, the example of a router/switch is explained.

At boot up, all routers have to have the capabilities to completely isolate every port from each other. It can be achieved by disconnecting temporarily the data link layer from the network layer for every port. At boot up, the only kind of protocols, which can be used, are point-to-point (P2P) protocols.

To break the network isolation of a port, a secure point-to-point protocol is needed to verify the trust/security level of the neighbor and to assign to it a privilege level. When it is assessed and security measures have been setup in correlation with the given privilege level, the port is defined to be fully operational, and can support end-to-end (E2E) protocols.

During enumeration or a similar phase, a router will know or learn what kind of node is connected to each of its ports. If an endpoint is encountered on a port, the switch knows that it can't get at anytime packets with a source address different than the one given to the endpoint during enumeration/discovery or the static value given by the endpoint. Any packet with a different source will be dropped.

If another router is encountered on a port, the router can use its own routing table to check if there is a node behind this port which has the same network address as the one found in the source field of the packet. If no node with this address is found, the packet is dropped.

It is important to note that this principle is fully applicable also in the case of a circuit switching addressing scheme.

Now, the example of endpoints is explained.

Trustable endpoints have full key encryption and secure protocol support. Two cases are to be distinguished: At first, the communication between trustable node where the nodes are responsible to create a secure end to end communication; no external parties are needed here. At second, the communication between a trustable node and an untrustable node, the untrustable node not having full key encryption and secure protocol support. The less secure communication may/will need an external party to enquire the level of security offered by mechanisms in the network. The trustable node can decide then if the level of security provided is sufficient to accept or create a communication with the untrustable node.

In the following, a preferred embodiment for an untrustable node is described.

The requirements are so that nodes fall in the untrustable category if for instance it would be too costly to have full key encryption capabilities, or its power budget would not allow it, etc. Nonetheless, it is desirable to enforce a certain level of trust or security by applying cheaper and less power angry solutions, if a lower level of security is acceptable.

According to preferred embodiments of the present invention, there is a number of cheap security mechanisms conceivable, wherein some examples therefor are described in the following.

On one hand, there is the possibility to effect a simple bit shifting of the payload which can use one or several Pseudo-Random Binary Sequence (PRBS) to change the values bits. This is no encrypted scenario, but may be enough in many cases. To further improve the mechanism, the PRBS may be changed over time more or less frequently to increase the difficulty of breaking the code.

On the other hand, there is the possibility to use a secured packet header with the alternatives of an encrypted header and a non-encrypted header.

In case of an encrypted header, one could have a protocol where part of the header is encrypted. The encryption would cover at least the source and destination network addresses. In this case, it is to be noted that every router needs to have fast decryption capabilities to not penalize the throughput of the network.

In case of the non-encrypted header, the header itself is not encrypted, but encryption is added to the packet, which can be used by the destination to check if the packet was originally sent by the trusted source and if the message was not modified. The encrypted "tag" can be build upon values only known by the source and destination, but also difficult to acquire by any other nodes. Here, endpoints need a simple form of encryption which is sufficient to encrypt and decrypt the "tag" in a reasonable amount of time.

According to a further preferred embodiment of the present invention, a procedure to propagate the trust in the network is executed. For this purpose, all nodes are isolated from the network. The trust seed uses the secure point to point protocol to discover direct neighbors. If direct neighbors are routers, the secure protocol is used to extend the trust. If the direct neighbor is an endpoint, the level of privilege is assessed, which can be given to the endpoint and the protection mechanisms are setup.

When a router has been discovered, it will start discovering its neighbor as well, repeating the same procedure as the one used by the trusted seed.

According to still another preferred embodiment of the present invention, connection oriented services and circuit are considered.

Usually connections are secured by using a specific protocol within the connection itself. Basically it means that the application designed with a non-secure connection may need to be rewritten if a secure connection is needed later on.

One could argue that Secure Shell (SSH) tunnels do exist, but this approach is not optimal in an embedded network system like the ones considered here, especially since the background before which the present invention is placed provides the opportunity to design the complete protocol stack from scratch. In this case, it is considered to be more interesting to have secure services part of the protocol stack itself and not an add-on protocol.

This approach has the advantage that any mechanisms, which can simplify or enhance the security at any layer in the stack, can actually be place at the optimum place within the stack.

Examples of the distributed architecture include a concept of circuit, which could be used to carry more than one connection per circuit.

If two nodes are using N connections to communicate, it would make sense instead of using N secured connections, to use one secured circuit carrying N connections. The big advantage of this approach is that the applications using the connected services are completely independent of the underlying mechanism: if the circuit is secured or not, if many connections are used and not part of a single circuit, etc.

Another advantage of this approach is that any internal protocol of the stack can use the secured services or not, and this is runtime or design time selectable.

For instance, if two nodes being in different hardware components need high security for their communications, the security needs would be significantly reduced if later both are placed in the same hardware chip. One could then optimize the cost by using a non-secure communication and thus transparently for the applications.

Figure 1:
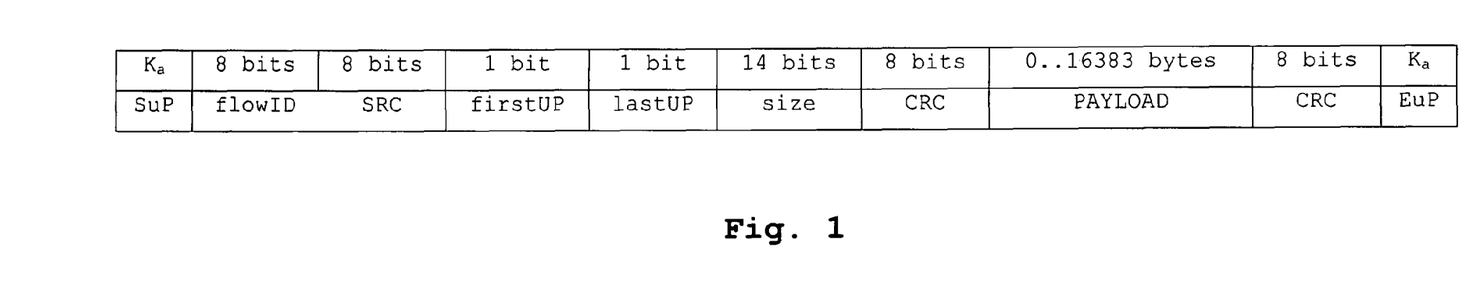
FIG. 1 shows a formerly proposed format of a Datalink layer packet concerning a first example.

A further preferred embodiment of the present invention is directed to the datalink layer reliability. The present preferred embodiment uses the back direction traffic for carrying acknowledgments for the forward direction traffic. A formerly proposed format of the Datalink layer packet (micro packet) is shown in FIG. 1.

According to recent proposals, regarding the optimal datalink layer packet size and sizes of the receiver and replay buffers, the length of the size field in the Datalink layer packet header can be reduced from 14 to 8 bits (the maximum micro packet size becomes 255 symbols). Depending on the implementation, the symbol length might be 1 byte, 2 bytes or some other value.

Figure 2:
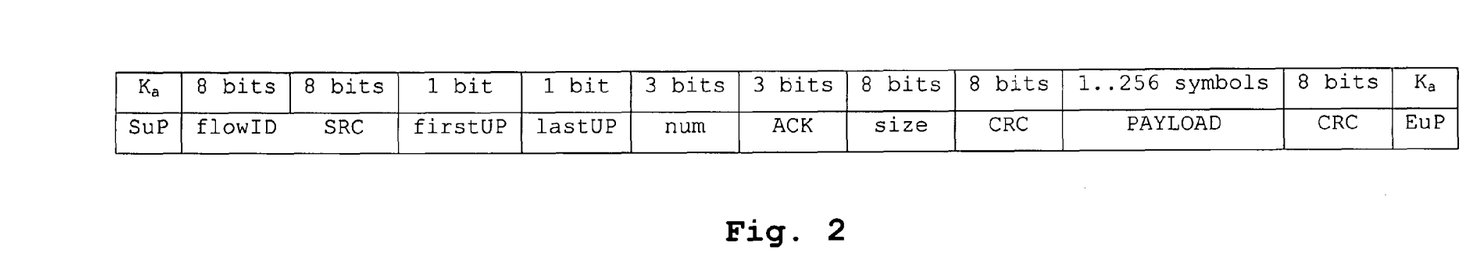
FIG. 2 shows the format of the Datalink layer packet according to a preferred embodiment of the present invention with respect to the first example.

This modification makes unused 6 bits in the dalalink packet header, which can be used for carrying the sequence number of the packet in forward direction and acknowledgment in the reverse direction. The format according to a preferred embodiment of the present invention of the Datalink layer packet is shown in FIG. 2.

The presented sizes of the new and modified fields are obtained as follows. According to the present proposals, the datalink layer buffer size is 4 KB=2K symbols. The budget of 8 sequence numbers is enough to provide efficient pipelining of the datalink layer packets. In order to guaranty that the datalink layer buffer is able to handle 8 packets, the maximum packet size should be 256 symbols.

According to the present embodiment, the sequence number and the acknowledgment are embedded into the datalink layer header of the packet. Together with the already defined CRC-based (cyclic redundancy check) error detection mechanism, the sequence number field allows the receiver to detect what packet(s) was/were lost, and using the acknowledgement field of the first packet going into the back direction, to inform the transmitter about the error. Each datalink packet receives a sequence number from 0 to 7, after 7 the counter is reset to 0. Also the packet carries the sequence number of the last correctly received packet from the other end of the link (acknowledgment).

The sequence number of three bits allows to pipeline up to 7 packets and the maximum packet size space is reserved for reconstruction of the new packet and verification. Note, that the maximum allowed pipelining is 7 packets and the acknowledgment field takes 8 values, which allows to use value of the last correctly received and acknowledged packet as an error marker (NACK).

In addition to the above-described changes, implementation of the datalink layer reliability requires a mechanism for storing unacknowledged packets. According to a preferred embodiment, the replay buffer is used which is one of the most well tested solutions for this purpose.

Accordingly, when the receiver gets a new correct packet, it checks if the sequence number is equal to the last received sequence number plus one. If the sequence number is right the receiver updates the value of the last correctly received packet. Also it extracts the acknowledgment information and forwards it to the replay buffer manager at the transmitter of the same link. If the acknowledged number matches to the sequence number of a packet in the replay buffer it means that all packets up to the given one were correctly transmitted to the receiver and they can be removed from the replay buffer. If the replay buffer is empty, the acknowledgment is ignored, as it happens in a case when traffic temporarily is not transmitted in the given direction and the transmitter receives copy acknowledgment of the last packet seen by the receiver. If the replay buffer does not have a packet with the acknowledged sequence number, it means that the receiver did not receive the new packets. This might happen due to the transmission delay of the main flow (the received packet was sent from the far end before the new packet was received), or due to the error in the main flow. In order to distinguish between these two cases, an additional rule was introduced, which tells that the replay procedure starts only if the replay buffer is more then half-full. This rule guarantees that the original packet had enough time to reach the far end and that the received acknowledgment can be interpreted as an error signal. Here, the further optimizations are possible, for example the replay will be allowed only after the link round trip delay timeout is expired, the number of packets that acknowledge the same sequence number can be counted and also used for triggering the replay procedure, etc. Selection of the most optimal procedure depends on the link parameters, and can be seen as a side issue to the present preferred embodiment.

If the described above case occurs, the reliability mechanism stops transmission of a new data and retransmits packets from the replay buffer. It is important to note that assignment of the ACK field and header's CRC is performed just before packet transmission, irrespectively whether the packet came from the main transmitter (TX) buffer or from the replay buffer.

Another important aspect corresponds to still another preferred embodiment and guarantees that the reverse direction traffic exists. That is, the link level flow control shall be a mandatory feature. It means that in the corner case the reverse direction traffic is presented by the flow control packets. To guaranty required density of the reverse direction traffic, the flow control packets generation procedure should be slightly modified. The required modification depends on the type of flow control procedure (e.g. credit based, window based, etc.).

An advantage of the above Datalink layer reliability related embodiments is their full compatibility. For example, deployment of the above proposed datalink layer reliability scheme may require only minor (similar to the earlier described) changes in the processing routines at the datalink layer transceiver and receiver. In addition, it could be needed to assign an acknowledgment function to the datalink layer start of frame, continuation of pre-empted frame and flow control frame control symbols. These three control symbols have reserved bits [2-0], which give the required three bits for the acknowledgment field in the headers of data and flow control packets. It is important to note that in possibly existing alternative datalink layer reliability schemes, the above embodiments may use the above described datalink layer packet sequence number in the footer of the data packets.

It is to be noted here, that with respect to the embedded acknowledgements as described above, the proposed packet format is only one possible implementation and other implementations, where the reverse direction traffic on the datalink layer within scope of one link is used for discovering flow disintegrate that is used for local detection and fixing problems and as a result maintain datalink layer reliability, are possible.

According to a further preferred embodiment of the present invention, the complexity of the datalink layer and the implementation can be decreased and the data overhead is reduced. This is achieved due to the following three factors: replacement of the sequence numbers-based acknowledgment scheme by packets counter-based acknowledgments, replacement of the RX buffer snapshot flow control by credit tokens-based flow control, and merge of L2 and L3 PDU headers. In particular, the present embodiment allows to not change the packet structure during the whole transmission from source to destination, and as a result keeping network switches very simple. Comparing to the prior art solutions, the present embodiment efficiently utilizes a difference in basic assumptions that can be made in case of E2E and P2P acknowledgment schemes.

Figure 3:
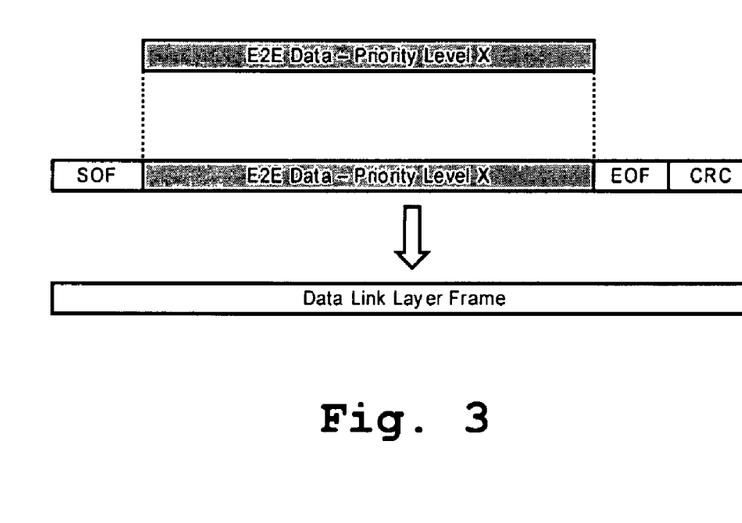
FIG. 3 shows the structure of an existing ("normal") L2 data frame concerning a second example.

FIG. 3 shows the structure of an existing ("normal") L2 data frame.

Figure 4:
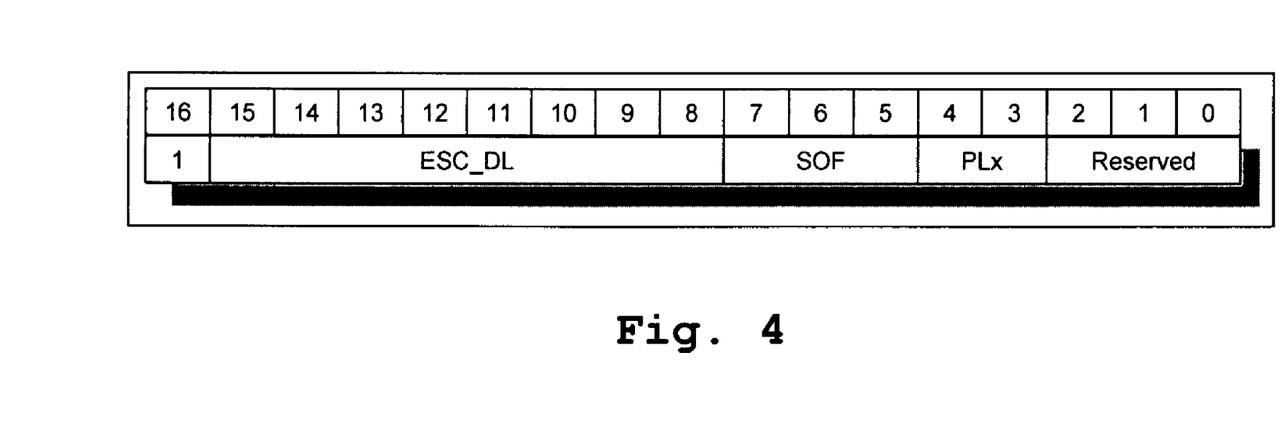
FIG. 4 shows the format of the SOF control symbol according to a preferred embodiment of the present invention with respect to the second example.

The header and trailer blocks are generated at the transmitter side of each link. The format of the SOF control symbol is shown in FIG. 4.

It is important to note here that the SOF symbol serves for detecting starting boundary of the new L2 packet, as SOF is a control symbol (bit 16 is set to 1), and also carries information about priority level of the frame, where the priority level has network-wide meaning.

Figure 5:
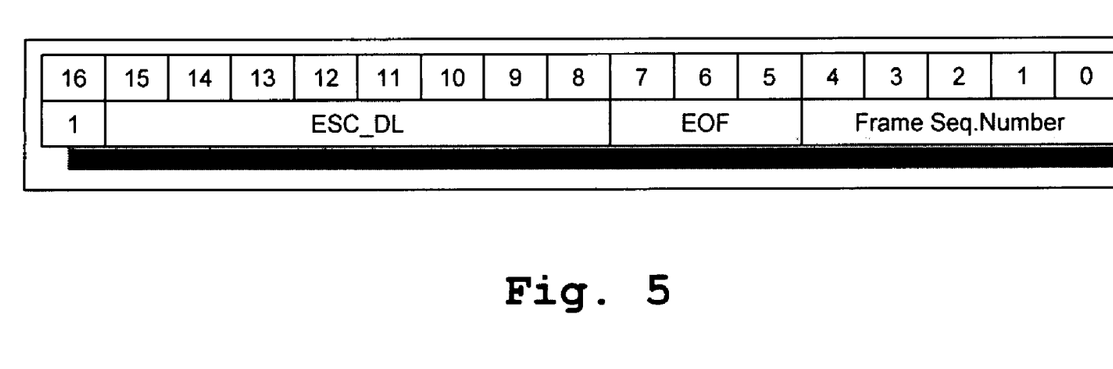
FIG. 5 shows the format of the EOF control symbol according to a preferred embodiment of the present invention with respect to the second example.

The format of the EOF control symbol is shown in FIG. 5.

The EOF symbol serves for detecting the end of the L2 packet and also carries the link layer sequence number of the frame, which is used by the receiver side for monitoring consistency of the flow. For detecting errors at the frame transmission time, the CRC symbol(s) is (are) generated. The CRC frame(s) covers the whole frame including SOF and EOF symbols, and because of that it should be regenerated at each links, as EOF symbol contains a variable field—frame sequence number.

A preferred embodiment includes to replace the current L2 frame encoding with the encoding scheme that combines L2 and L3 packet headers. Deployment of this modification allows to replace the SOF symbol with the more informative control symbol (which contains L3 data, e.g. packet length, etc.) and to remove EOF symbols, and also gives CRC a network-wide meaning. In order to have a link layer reliability mechanism without using frame sequence numbers, a key difference is utilized which occurs between the assumptions that can be made in classical end-to-end reliability schemes, and the assumptions valid in point-to-point case. In P2P case it is enough to just count the number of received packets and inform the transmitter side about the number of received frames. Generation of new acknowledgments (ACK) is triggered by the counter of received frames, when the number of received frames exceeds a certain threshold, and by the error detection procedure. It is important to note here that the threshold should be always greater than one, as otherwise acknowledgment of acknowledgment deadlock might occur.

In comparison to the existing solution, the above preferred embodiments do not need a separate queue for acknowledgements (ACK), as generated ACK are put to the same priority queue as the data frames. It is import to note here that by doing so reliable ACK are obtained for free, as the main data flow has reliability function, so that loss of ACK frame does not create problems. Also, according to a preferred embodiment of the present invention, it is recommended to put ACK in front of the data traffic, which is easy to do at the currently existing buffering scheme.

A preferred embodiment does not require a timeout-based generation of acknowledgments, as even if two frame sequences of the same priority are separated by the long time delay, and the first sequence does not contain enough frames to reach acknowledgment generation threshold, it just means that packets from the first sequence will be stored in the transmitter buffer (replay buffer) for the time between the frame sequences, which behaviorally does not change anything, but allows to simplify receiver logic. The proposed scheme uses NACK in the same way as the existing proposal, where instead of sequence numbers for all priority queues the number of correctly received frames are put for each priority.

Figure 6:
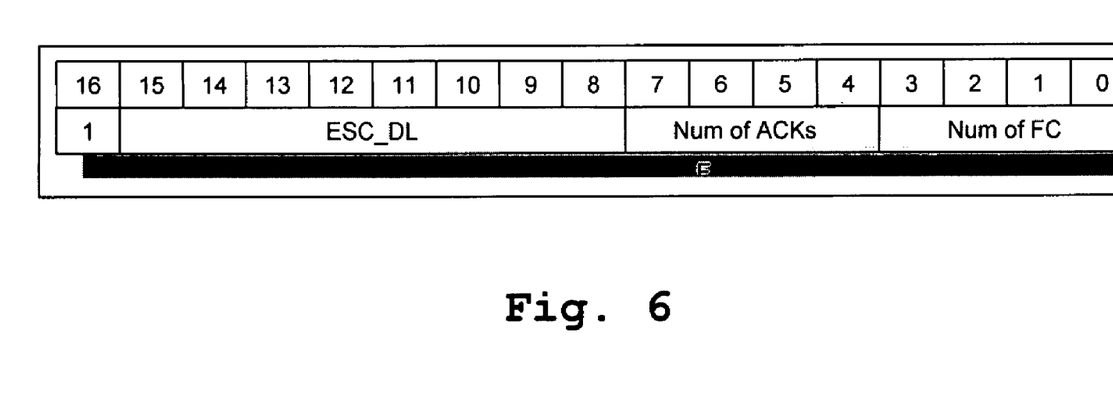
FIG. 6 shows the format of a combined ACK+FC control symbol according to still another preferred embodiment with respect to the second example.

According to a still further preferred embodiment of the present invention, it is returned to the classical credit based flow control combined with the acknowledgment mechanism, where each flow control token represents availability of a certain space at the receiver side. In this case the format of combined ACK+FC control symbol is as is shown in FIG. 6.

Four bits fields are enough for both ACK and FC counters, according to the present embodiment only the relative change of the counters state is transferred; and from the buffer use perspective it is enough to have those up to 15 tokens.

An alternative ACK and FC handling might be built using principles that were proposed above with respect to datalink layer reliability using the reverse direction traffic.

An existing solution defines that L2 frame encapsulates one L3 packet, so there is no L2 aggregation. Based on that now there are no reasons to have a priority level field and CRC symbol(s) associated with the L2 frame, and instead they can be defined as a part of the L3 header and trailer to the L3 packet, correspondingly. Based on that it can be said that SOF and EOF control symbols become completely redundant as they do not contain additional information, and only needed to specify frame boundaries. However, this functionality can be taken by L3 header symbol, if it already contains packet length, which in would be equal to the frame length, here. If the line coding mechanism remains as it is defined above, only the L3 header symbol needs to be defined on the basis of a control symbol, where the high byte is set to ESC_DL. As a result, the L2 overhead is reduced from 4 bytes to 1 bytes, the functionality of L2 blocks is simplified significantly (no need in creating and processing additional control symbols, regenerating CRC at each hop, have separate treatment of ACK+FC packets, have additional NACK symbol, etc.), which allows to make end devices and especially network switches much simpler.

According to still another preferred embodiment of the present invention, a method is provided which allows the tunneling of a serial computer bus such as an inter-integrated circuit ($I^2C$) to attach low-speed peripherals to e.g. a motherboard, an embedded system or a cellphone over a fast bus such as "Discobus", "MIPI UniPro", etc., which is independent of the latency of the bus or the network topology. Of course, the latency independence of this method has a price: if the latency of the bus or network is too high, the actual bandwidth of the $I^2C$ bus will be reduced transparently to accommodate the high latency.

The benefit of this embodiment is inter alia to ensure a smooth transition between legacy and/or dedicated current interfaces towards a more generic approach as followed by e.g. "Discobus" or "MIPI UniPro".

Indeed, existing interfaces for camera (CSI) and for display (DSI) are using an $I^2C$ bus as control bus. When considering the mechanical constraints put by hinges in a mobile device, it is well known that as few wires as possible over the hinge will always be the most cost effective solution and the most optimal in terms of freedom given to the mechanical design itself.

In this context, camera and display interfaces are moving towards using a low power high-speed serial link bus like concept such as provided by e.g. "Discobus" or "UniPro" for the next generation of interfaces, which implies a transitory situation where current interfaces for camera and display would have to be tunneled over a fast bus. The most problematic aspect of tunneling those interfaces is the latency issue coming from usage of $I^2C$ as a control bus. In other words, if the tunneling of $I^2C$ over a low power high-speed serial link bus (such as "Discobus" or "UniPro") like system is not solved at low cost and in an efficient way, it may have a bad impact on the future of a generic and modular solution.

In the following, a preferred embodiment for the architecture of latency independent tunneling of $I^2C$ over a fast bus is described.

For explanatory purposes, a distinction is made here between a local and a remote $I^2C$ bus, but is independent of the topology of the system and change with time. The distinction is based on where at a given time a master trying to access an $I^2C$ bus is located. The bus, which is electrically connected to said master by an $I^2C$ bus is called the local $I^2C$ bus; any other $I^2C$ bus in the system tunneled through a low power high-speed serial link bus as presently considered (like "Discobus" or "UniPro") is said to be a remote I2C bus.

So the distinction between local or remote I²C is bound or relative to a given master trying to access an I²C bus. For two masters on different I²C busses, a same I²C bus can be local for one master, but remote for the other master.

Figure 7:
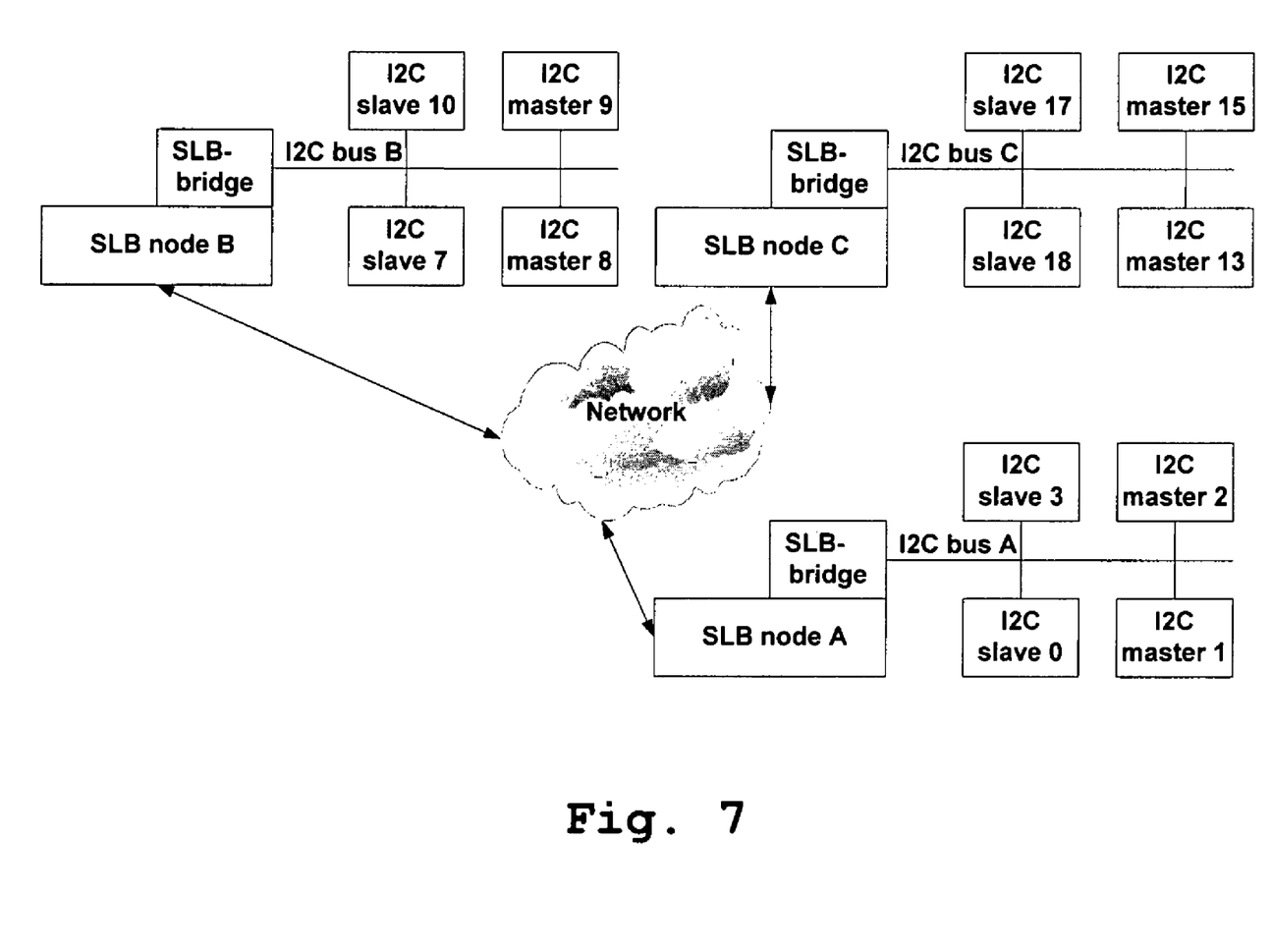
FIG. 7 shows a generic case of tunneling of $I^2C$ according to a preferred embodiment of the present invention.

FIG. 7 shows a generic case of tunneling of I²C. I²C bus A is local for I²C master 1 and 2, but is remote for I²C master 8, 9, 13 and 15.

It is to be noted that the network could degenerate to only a single point-to-point link between two nodes, so the concept of network encompasses as well a single point-to-point link.

For a better understanding, the main issues of an I²C bus are summarized below.

In I²C, all masters are generating their own clock on the I²C clock line SCL (signal clock line) to transfer and receive data. Since I²C is a multi-master bus, a mechanism for clock synchronization is needed and is performed using the wired-AND connection of I²C interfaces to the serial data line (SDA).

Since the data is only valid when the clock is high, the low state of the clock will be extended by the slowest master; it will in turn force the faster masters to wait till they can see the serial clock (SCL) line high, which is the start of the next period of the SCL clock.

In other words, every master has to monitor the SCL line when driving it to be sure that no slower masters are driving the SCL line as well. If a slower master is driving the SCL line, which can be seen by extended low state of the SCL line, a faster master has to wait till the slowest master pull the SCL line high again, starting then a new clock period.

In a multi-master bus, a master can start a transfer on the bus only when the bus is free. But, the situation where more than one master tries to access the bus at the same time, or the accesses are in a short enough time not allowing any masters to detect that somebody else took control of the bus, is probable: I²C has then an arbitration mechanism to given the control to only one master. The principle is rather simple: each master monitors the SDA line, the data line, and check if what is sent is the same as what is on the line. When a master sees that the SDA line is not in a state (low or high) that the master is driving, the master has lost the arbitration and should stop driving the line. The master seeing always the pattern is sending also on the SDA line has won the arbitration mechanism and has full control of the bus.

Here, the clock synchronization can be used as a flow control mechanism. In the I²C specification, the clock synchronization mechanism gives the possibility for a device on the bus to slow down the master by extending the low clock period at the byte level, but also at the bit level if not in the HS mode. In other words, any device on an I²C bus can slow down the bus at the bit level by extending the low clock period of the SCL line if the use of the HS mode (3.4 Mbit/s) on this bus is excluded.

Next, a preferred embodiment for I²C tunneling in the low power high-speed serial link bus architecture is described. Here, I²C tunneling is seen as a very important factor to enable a smooth transition between current device architecture and the low power high-speed serial link bus type of architecture. Indeed, in current architectures, I²C is heavily used for different kind of control mechanism in the device. To simplify the transition, it is then of great importance to tunnel I²C, allowing a transparent change in the control path in the device for a hardware but also software point of view.

The basic idea of I²C tunneling is very simple: the three mechanisms clock synchronization, arbitration, and clock synchronization as a flow control mechanism is combined with the added requirement that the interface between an I²C bus and said low power high-speed serial link bus as presently considered should be a special I²C interface.

To distinguish between what is related to the physical and protocol specification of I²C and what is purely related to the presently considered low power high-speed serial link bus protocols, the following three terms are introduced: Serial link bus-I2C interface or simply SLB-I2C interface is the modified I²C interface needed to support the bridging mechanism; serial link bus-I2C bridging module or simply SLB-I2C BM is the module which tunnels I²C protocol on this serial link bus; and serial link bus-I2C bridge or simply SLB-I2C bridge is the combination of the two previously stated devices.

As described above, the SLB-I2C interface is said to be a modified I²C interface, nevertheless it still remains 100% compatible with the standard mode and the fast mode of the I²C specification, but it is not compatible with the High-Speed mode.

The SLB-I2C interface includes an I²C slave and an I²C master, both with small particularities. The I²C slave will of course have its own I²C address and then acknowledge access to its address. It would not acknowledge accesses at addresses different from its own, but it will nonetheless forward these accesses to the SLB-I²C bridging module.

The I²C master has the possibility to extend the low period of the SCL line without requiring any I²C data transfer and without owning the bus, to fake a arbitration win over the I²C bus and the possibility to extend the low period of the SCL clock line just before the acknowledge bit when owning the bus.

The SLB-I²C bridging module includes a set of finite automata forming the tunneling layer of I²C over a fast bus, and 2 lookup tables: The first table, called local I²C table, contains all the I²C addresses of all the I²C devices connected to the same local I²C bus at the SLB-I2C interface. The second table, called remote I²C table, contains the relations between the I²C addresses of remote I²C devices and the serial link bus network address plus port (or compressed form of the destination address) of the remote SLB-I²C bridge. Alternatively, it could contain the virtual I²C bus address and not the serial link bus network address of SLB-I²C bridge, but it would require a broadcast on the fast bus.

When an I²C transfer is started on the local I²C bus, the SLB-I²C bridging module will use both tables to determinate the physical location of the addressed I²C devices. If the addressed device is local, the bridging module will take no other actions and the I²C transfer will occur as dictated by the I²C specification on the local bus. If the addressed device is a remote I²C device, the SLB-I²C bridging module will get from the remote I²C table the network address of the remote SLB-I²C bridge connected to the local bus where the targeted I²C device is attached. The I²C transfer will be coded by the SLB-I²C bridging module and send through the fast bus to the targeted remote SLB-I²C bridge. The bridging module in the targeted SLB-I²C bridge will decode the received I²C transfer and start this transfer on its local I²C bus. If the targeted remote local I²C bus is busy, which means that another I²C master owns this bus, a busy signal will be sent back to the local I²C bus. When the transmitter SLB-I²C bridge receives the busy signal, it will then generate a fake loss on the local bus: the master trying to get access to the remote I²C bus will then believe that another master has won the arbitration and has by consequence been granted access to the bus. It is then up to him to try to get access to the bus later.

Another way would be to skip the generation of the acknowledge bit on the I²C local bus, but it may be less transparent for the I²C master because it cannot be ensured what meaning will be attached to this event by the I²C master.

According to another preferred embodiment of the present invention involving 10 bit address mode, the following applies. That is, so far only the 7 bit address mode has been considered, but the same can be applied to the 10 bit address mode. The only difference is that the SLB-I²C bridge needs to wait to receive 2 bytes before to be able to look in the local I²C table and remote I²C table.

Of course the mechanism described here follows the I²C specification where both addressing modes can coexist on the same bus. It simply means for the SLB-I²C bridging module that it should look at the 1 byte of a transaction, because the addressing mode is defined in the first byte. Knowing which addressing mode is used, it can decide to wait for the second byte if in 10 bit addressing mode or not wait the second byte if in 7 bit addressing mode and check in the local and remote I²C tables if the address corresponds to a local or remote I²C device. Then it can continue with the procedure defined previously.

The details of the I²C tunneling timing are described hereinafter.

Figure 8:
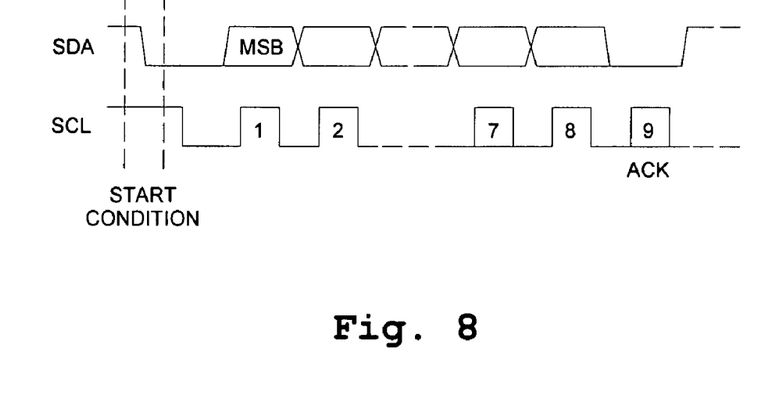
FIG. 8 shows the $I^2C$ local read/write access according to a preferred embodiment of the present invention.

FIG. 8 shows the I²C local read/write access according to a preferred embodiment of the present invention.

Here, presented is the first byte of a standard read/write access on the I²C bus: one can see that the slave has acknowledged the transfer.

The same access will occur if the local I²C master started a transfer with a slave located on the same local I²C bus.

Figure 9:
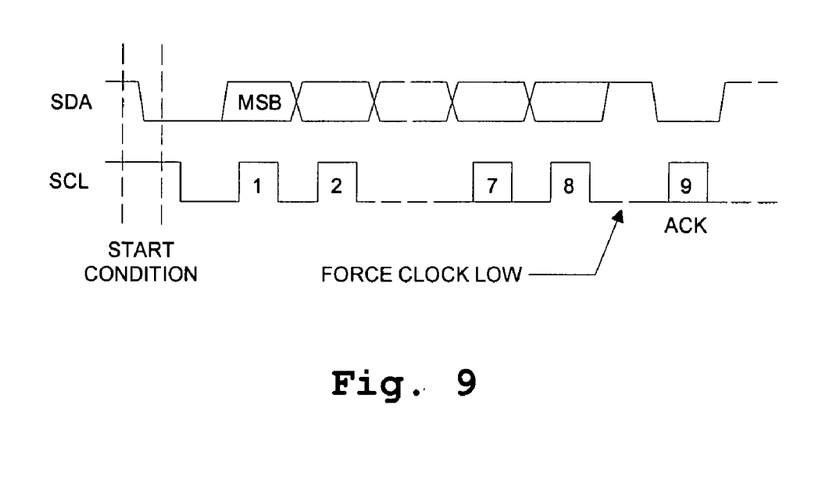
FIG. 9 shows the $I^2C$ remote read/write access according to a preferred embodiment of the present invention.

FIG. 9 shows the I²C remote read/write access according to a preferred embodiment of the present invention.

Here, presented is the first byte of a remote read/write access. The difference compared to a local I²C access is the extended period between clock 8 and clock 9. This extended period is created by the master part of SLB-I²C interface. This extended period will vary depending of the bus load between the SLB-I²C interface origin and the SLB-I²C interface destination, making I²C tunneling insensitive to the latency of the high-speed bus.

Of course, there is one limitation. Some I²C masters may have a timeout mechanism, so to avoid difficulties it is recommended to have the extended period shorter than any timeout in the system.

Figure 10:
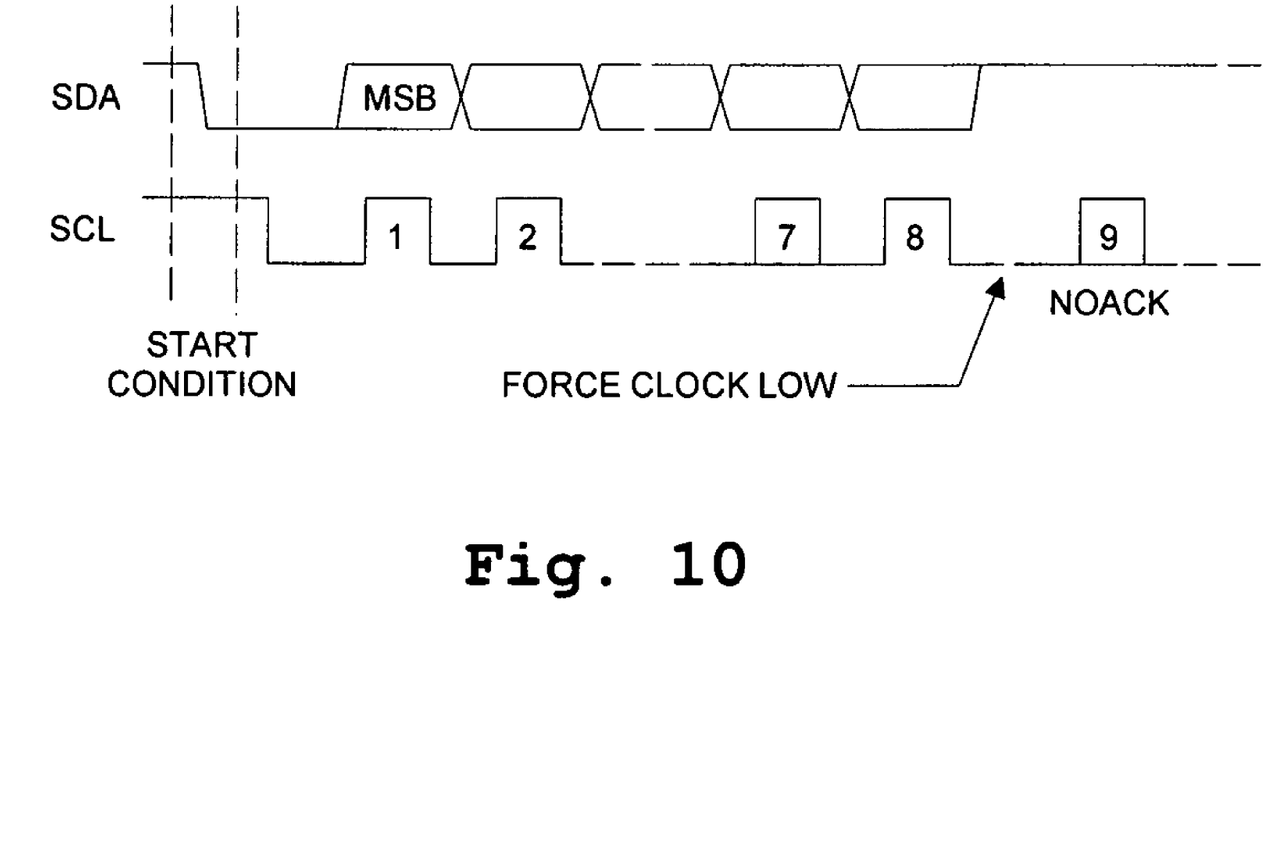
FIG. 10 illustrates the loss of arbitration when accessing a remote $I^2C$ device according to a preferred embodiment of the present invention.

FIG. 10 illustrates the loss of arbitration when accessing a remote I²C device according to a preferred embodiment of the present invention.

Here, presented is the first byte of a remote read/write access. The difference with the I²C remote read/write access is the missing acknowledge, which can have few reasons: At first, the destination slave can be on a busy local I²C, meaning another master than the SLB-I²C bridge is master of the bus at this moment; at second, the I²C destination address may not be found on the remote I²C bus, which can be caused either by the destination I²C device not working properly any longer or being switched off, or by an error in the remote I²C table of the SLB-I²C bridge; at third, the destination SLB-I²C bridge may have lost arbitration, and another master was granted access to the remote I²C bus; and at fourth, there may be a virtual I²C bus.

As an alternative, the mapping between network addresses of SLB-I²C bridge and I²C addresses to create virtual I²C busses can also be changed slightly. Then, there can be several simulated I²C bus tunneled over the serial link bus: each virtual I²C bus would be independent of the others. To have this feature, each SLB-I²C bridge should know to which virtual I²C it belongs and the remote I²C table would include only the SLB-I²C bridges part of the same virtual I²C bus.

Since I²C is used mainly as a control bus, it may be useful to make a distinction between a private and public I²C bus to give restricted accesses to some resources of the terminal.

While it has been described above what is presently considered as the preferred embodiments of the present invention, it is now clear to the skilled reader that various modifications and changes may be made without departing from the spirit and scope of the appended claims.

The invention claimed is:

1. An apparatus comprising:
a node configured for use in a communication network with a distributed architecture, wherein the node comprises at least one processor, the node further comprising:
a key encryption functionality;
a transceiving functionality for transmitting and receiving packets;
a privilege level introduction functionality configured to introduce a first privilege level into packets to be transmitted; and
a comparison functionality configured to compare a second privilege level of said received packets with a third privilege level assigned to any node from which said packets are received, wherein said received packets are dropped when said received packets violate the third privilege level of said any node to spread trust in the communication network using the distributed architecture, wherein trustable nodes are used and defined by having key encryption capabilities and untrustable nodes are used and defined by not having key encryption capabilities; and
an assigning trust functionality configured to assign trust corresponding to a fourth privilege level to other nodes by using a trusted boot mechanism for said communication network, wherein said assigning of the trust comprises assigning the trust to other nodes by a key encryption based authentication process.

2. The apparatus according to claim 1, wherein said introduced first privilege level is introduced into a special field in the header of a packet to be transmitted.

3. The apparatus according to claim 1, further configured to acquire trust based on a key encryption based authentication process.

4. The apparatus of claim 1, wherein the first privilege level, the second privilege level, the third privilege level, and the fourth privilege level comprise the same level.

5. The apparatus of claim 1, wherein the first privilege level, the second privilege level, the third privilege level, and the fourth privilege level comprise different levels.

6. An apparatus comprising:
a node configured for use in a communication network with a distributed architecture, wherein the node comprises at least one processor, the node further comprising:
a key encryption functionality;
a transceiving functionality for transmitting and receiving packets;
a privilege level introduction functionality configured to introduce a first privilege level into packets to be transmitted; and
a comparison functionality configured to compare a second privilege level of said received packets with a third privilege level assigned to any node from which said packets are received, wherein said received packets are dropped when said received packets violate the third privilege level of said any node to spread trust in the communication network using the distributed architecture, wherein trustable nodes are used and defined by having key encryption capabilities and untrustable nodes are used and defined by not having key encryption capabilities; and an assigning trust functionality configured to assign trust corresponding to a fourth privilege level to other nodes by using a trusted boot mechanism for said communication network, wherein the apparatus is further configured to isolate each port of said node from each other, and to only allow a secure point-to-point protocol at a boot-up process of said communication network.

7. The apparatus according to claim 6, wherein said isolation is effected by temporarily disconnecting a data link layer from a network layer for every port.

8. A method, comprising:
receiving packets by a trustable node;
introducing a first privilege level into packets to be transmitted by said trustable node; and comparing a second privilege level of said received packets with a third privilege level assigned to any node from which said packets are received, wherein said received packets are dropped when said received packets violate the third privilege level of said any node to spread trust in a communication network using a distributed architecture, wherein trustable nodes are used and defined by having key encryption capabilities and untrustable nodes are used and defined by not having key encryption capabilities; and
assigning trust corresponding to a fourth privilege level to other nodes by using a trusted boot mechanism for said communication network, wherein said assigning of the trust comprises assigning the trust to other nodes by a key encryption based authentication process.

9. The method according to claim 8, wherein said introducing of said third privilege level comprises introducing said privilege level into a special field in the header of a packet to be transmitted.

10. The method according to claim 8, further comprising: acquiring trust corresponding to a privilege level by a key encryption based authentication process.

11. A method comprising:
receiving packets by a trustable node;
introducing a first privilege level into packets to be transmitted by said trustable node; and comparing a second privilege level of said received packets with a third privilege level assigned to any node from which said packets are received, wherein said received packets are dropped when said received packets violate the third privilege level of said any node to spread trust in a communication network using a distributed architecture, wherein trustable nodes are used and defined by having key encryption capabilities and untrustable nodes are used and defined by not having key encryption capabilities;
isolating each port of said node from each other; and
allowing only a secure point-to-point protocol at a boot-up process of said communication network.

12. The method according to claim 11, wherein said isolating of each port of said node comprises temporarily disconnecting a data link layer from a network layer for every port.

13. A system comprising:
trustable nodes defined by having key encryption capabilities;
untrustable nodes defined by not having key encryption capabilities, wherein selective ones of said trustable nodes and said untrustable nodes are operably connected so that they can transmit and receive packets between each other, wherein said trustable nodes are configured to introduce a first privilege level into packets to be transmitted, and wherein said trustable nodes are configured to compare a second privilege level of received packets with a third privilege level assigned to a any node from which these packets are received, wherein said received packets are dropped, when said received packets violate the third privilege level of said any node, wherein said trustable nodes are further configured to isolate each port of said trustable node from each other, and to only allow a secure point-to-point protocol at a boot-up process of a communication network.

14. The system according to claim 13, wherein said trustable nodes are further configured to effect said isolation by temporarily disconnecting a data link layer from a network layer for every port.

* * * * *